(12) United States Patent
Hyers

(10) Patent No.: US 8,659,757 B2
(45) Date of Patent: Feb. 25, 2014

(54) VISUAL TESTING METHOD FOR EVALUATING CHROMATIC ABERRATION

(75) Inventor: Michelle L. Hyers, Greenlawn, NY (US)

(73) Assignee: Carson Optical, Inc., Hauppauge, NY (US)

( * ) Notice: Subject to any disclaimer, the term of this patent is extended or adjusted under 35 U.S.C. 154(b) by 321 days.

(21) Appl. No.: 13/134,528

(22) Filed: Jun. 9, 2011

(65) Prior Publication Data
US 2012/0314216 A1    Dec. 13, 2012

(51) Int. Cl.
*G01J 3/52* (2006.01)

(52) U.S. Cl.
USPC .......................................................... 356/421

(58) Field of Classification Search
USPC .............. 356/124, 125, 416, 419, 421
See application file for complete search history.

(56) References Cited

U.S. PATENT DOCUMENTS

| | | | |
|---|---|---|---|
| 2,190,008 A | 2/1940 | Beitel | |
| 4,293,200 A | 10/1981 | Dobson et al. | |
| 4,660,945 A | 4/1987 | Trachtman | |
| 4,861,156 A | 8/1989 | Terry | |
| 5,165,063 A | 11/1992 | Strater et al. | |
| 5,677,750 A * | 10/1997 | Qi | ................. 351/205 |
| 5,889,625 A | 3/1999 | Chen et al. | |
| 5,997,142 A | 12/1999 | Nakagawa | |
| 6,515,801 B1 | 2/2003 | Shimizu | |
| 6,536,907 B1 | 3/2003 | Towner et al. | |
| 6,604,826 B2 * | 8/2003 | Akiyama et al. | ............... 351/216 |
| 6,760,096 B2 | 7/2004 | Kitabayashi et al. | |
| 6,788,401 B1 | 9/2004 | Kitabayashi et al. | |
| 7,075,633 B2 * | 7/2006 | Wegmann | ....................... 356/124 |
| 7,688,431 B1 * | 3/2010 | Balch et al. | .................... 356/124 |
| 7,865,031 B2 | 1/2011 | Bushell et al. | |
| 2008/0062409 A1 * | 3/2008 | Utsugi | ........................... 356/124 |

OTHER PUBLICATIONS

F. W. Campbell, The Effect of Chromatic Aberration on Visual Acuity, Pub J. Physiol., p. 345.*
"Optics" Fourth Edition, Eugene Hecht, Pearson Education, Inc., 2002, pp. 201-205, 268-273.

* cited by examiner

*Primary Examiner* — Gregory J Toatley
*Assistant Examiner* — Maurice Smith
(74) *Attorney, Agent, or Firm* — Carmody Torrance Sandak & Hennessey LLP

(57) ABSTRACT

This invention comprises a method of visually comparing the chromatic aberration in two or more optical devices. The test reveals differences in the ability of an optical product to minimize chromatic aberration, so that ideally, various colors (corresponding to specific wavelengths) will have a sharp focus at almost the same distance away from the last optical element. The method provides a consistent way to test the chromatic aberration in various optical products that is more visually observable than the process of noting the halo of colors that appears along the edge of a dark object on a light background. The test is especially geared toward comparing binoculars with different optical material composition such as ED glass (Extra-low Dispersion) or FL (Fluorite) glass to those with conventional types of glass.

29 Claims, 8 Drawing Sheets
(8 of 8 Drawing Sheet(s) Filed in Color)

Optical device with low chromatic aberration

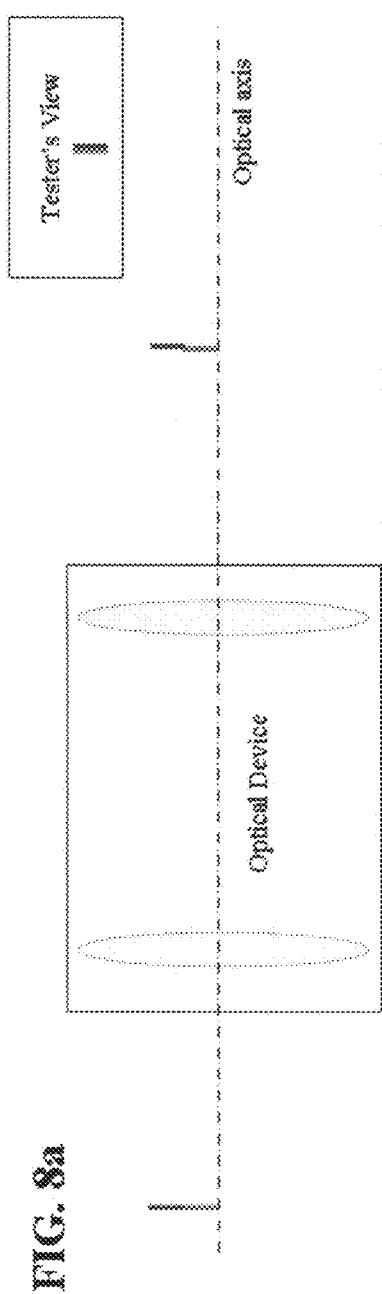
FIG. 8a  Optical device with low chromatic aberration
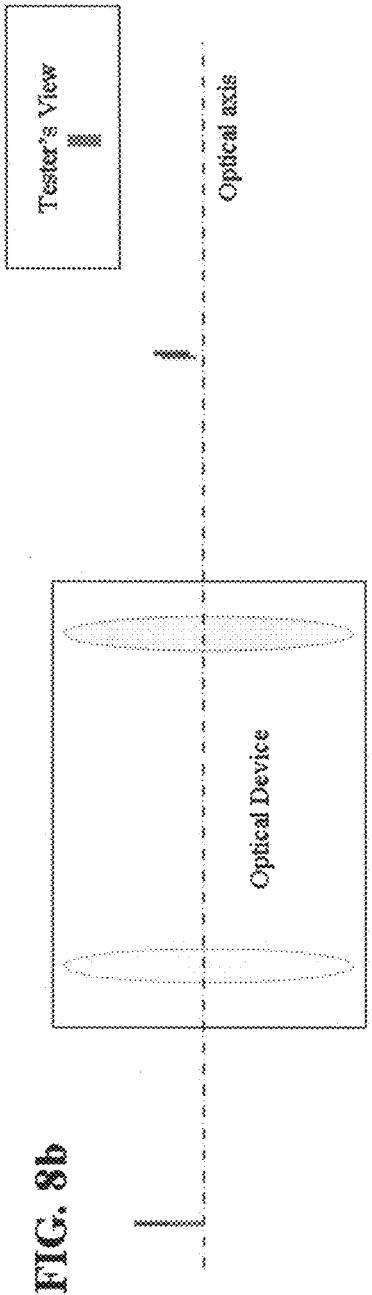
FIG. 8b  Optical device with high chromatic aberration

VISUAL TESTING METHOD FOR EVALUATING CHROMATIC ABERRATION

BACKGROUND OF THE INVENTION

1. Field of the Invention

The present invention consists of a visual testing method for observing chromatic aberration between two optical devices. This testing method provides the tester of the optical devices with a noticeable and easily perceivable result that clearly distinguishes an optical device with lower chromatic aberration from that of an optical device with higher chromatic aberration. Furthermore, the test has been designed to allow the tester to distinguish the chromatic aberration properties of two optical devices that have only fine differences in chromatic aberration, such as the differences between ED (extra-low dispersion) and non-ED glass, which may not be visually noticeable in practice except for those highly trained and experienced in the optics field.

2. Description of Related Art

Many optical devices that we use frequently involve the viewing of color: binoculars can be used for enjoyment when users look out over beautiful vistas, for education when bird watchers observe details of a bird's nesting habits, or for utility when hunters track their prey. In all these situations, many colors are input into the optical system, and the optical system has slightly different properties for each color, corresponding to a specific wavelength of light. The term for the variation of the properties of a lens when analyzing over different wavelengths or colors is known as chromatic aberration. Chromatic aberration results in a distortion of the image produced when viewing multi-colored objects through an optical lens, because the lens is unable to focus all colors to the same point. This difference in focal lengths is due to the variation of the index of refraction according to wavelength. As a result of the optical properties varying according to wavelength, red objects focus at different distances than blue objects.

There are numerous examples of complex optical systems or methods that are all aimed at the goal of reducing chromatic aberration, especially computerized systems or specific instrumentation that can measure the chromatic aberration in a system. The data measured is then either used to make corrections in the digital information or to specify how well a new design minimizes chromatic aberration. These methods involve complex and expensive instrumentation to determine chromatic aberration properties, especially aberrations that are not visually observable.

The computerized methods often use either a black circle or another dark shape on a white background. Chromatic aberration is shown in this case as a halo of color around the dark object, with different colors showing at different places around the circle corresponding to the different focal lengths of each wavelength. The computer can then extract the data through computation or the data can be received from the camera in an RBG or equivalent format, where the result is several circles of various colors each at a different offset location than the original black circle. Another method is to highlight a shape or pattern with different colored lights, one at a time, and then compare the recorded information. In regards to visual testing for chromatic aberration, current methods may include looking at objects around the tester, for example, a dark colored boat in the distance on a bright day. The problem is that all these types of testing methods become highly subjective when used as a visual testing method, so that the testing method becomes very inaccurate and useless in systems with low chromatic aberration or small differences in chromatic aberration. For example, in the case of a fairly well chromatically corrected optical system, a test such as the black circle will only produce an extremely thin color halo. The tester then would have to observe the difference in thickness of the halo compared to another device with another very thin border of color, which introduces too much human error. Clearly there is a need for the invention of a new testing method to provide a clear visual result to the tester without the need for computers or instrumentation, which can provide a more quantifiable result.

In regards to visual testing methods in general, there are examples of visual testing methods to measure other optical performance properties such as resolution or contrast, but no current visual testing method exists for chromatic aberration, which doesn't utilizing other equipment or instrumentation. Also, there has been use of visual charts that involve chromatic aberration but are based upon the exploitation of the existence of chromatic aberration, not the measuring or quantifying of the aberration. For example, one application is for use for optometrists or other health professionals, wherein colored charts or letters are presented to the individual who is being tested, as a means of gauging whether their eyeglasses or other lens correction has been adjusted accordingly. When the individual being testing sees a certain color focused more than another, it indicates to the optometrist that their prescription is either over-corrected or under-corrected. The chromatic aberration of the eyeglass is not being tested, just merely used as an indication if there is a need to adjust the focal length of the corrective device.

SUMMARY OF THE INVENTION

In accordance with a first embodiment of the invention, a method for visually testing the chromatic aberration in an optical device is provided. In this embodiment, the method utilizes a testing apparatus that has a representation of at least two or more colors denoted by their wavelength, such that each color utilized is separated by no less than 75 nanometers in wavelength, and where each color is set beside another in close proximity, in a pattern, shape, or letter, or any combination thereof, and further wherein a tester is positioned at a distance away from the testing apparatus that is the same or greater than the minimum focal distance of the optical device being tested, wherein the method compromises the steps of viewing the testing apparatus through at least the optical device being tested, and visual observing the resulting image, either directly or indirectly by means of an imaging or projecting device; determining the degree of chromatic aberration based upon the number of distinctive objects viewed in a single test iteration, where two or more distinctive objects or features viewed corresponds to an optical device with low chromatic aberration, a partially merged object viewed corresponds to an optical device with medium chromatic aberration, and whereas only a single or merged object or feature viewed corresponds to an optical device with high chromatic aberration; and providing an assessment of the chromatic aberration based upon the determining step.

In another preferred embodiment of the invention, an apparatus for visually testing the chromatic aberration of an optical device is provided, which presents to the tester, a representation of at least two or more colors denoted by their wavelength, such that each color utilized is separated by no less than 75 nanometers in wavelength, and where each color is set beside another in close proximity, in a pattern, shape, or letter, or any combination of those, on a background different from any of the two or more colors.

In yet another preferred embodiment of the invention, a testing chart is provided, which is a representation of at least two or more colors denoted by their wavelength, such that each color utilized is separated by no less than 75 nanometers in wavelength, and where each color is set beside another in close proximity, in a pattern, shape, or letter, or any combination of those, on a background different from any of the featured colors.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 shows an optical schematic displaying how the testing method in the above embodiments alters the testing object based on the chromatic aberration of the optical system into the testing image that is viewed by the tester.

DETAILED DESCRIPTION OF THE PREFERRED EMBODIMENTS

Figure 1:
FIG. 1 is an example of a test image illustrating a preferred embodiment of the testing method using strips of two colors. Upon viewing with an optical device that has high chromatic aberration, the strips appear to blend together, now perceived as a single strip of another color (in this example, purple). However, when viewed with an optical device with low chromatic aberration, each strip is distinguishable and distinct, compromised of one strip of the first color and one strip of the second color.
Figure 2:
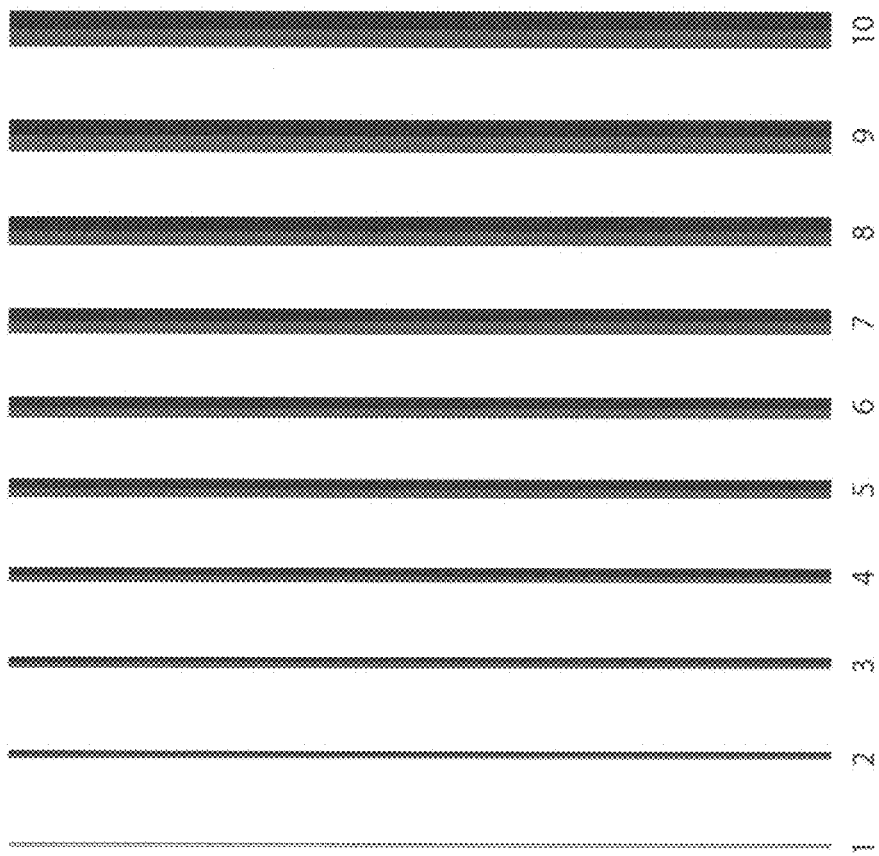
FIG. 2 demonstrates the use of the above embodiment in an array format, to allow for the tester to identify the specific point at which an optical device's chromatic aberration properties affect the image they are viewing. In this example, the tester will be able to identify certain strips whose colors remain distinct, whereas thinner strips will begin to merge in color as the device's chromatic aberration affects their view. The labeling of the array can be done in number units to provide a rating of chromatic aberration, or if calibrated for given set of testing parameters, the chart could be labeled with the Abbe number (or another preferred quantity) range for each iteration.
Figure 3:
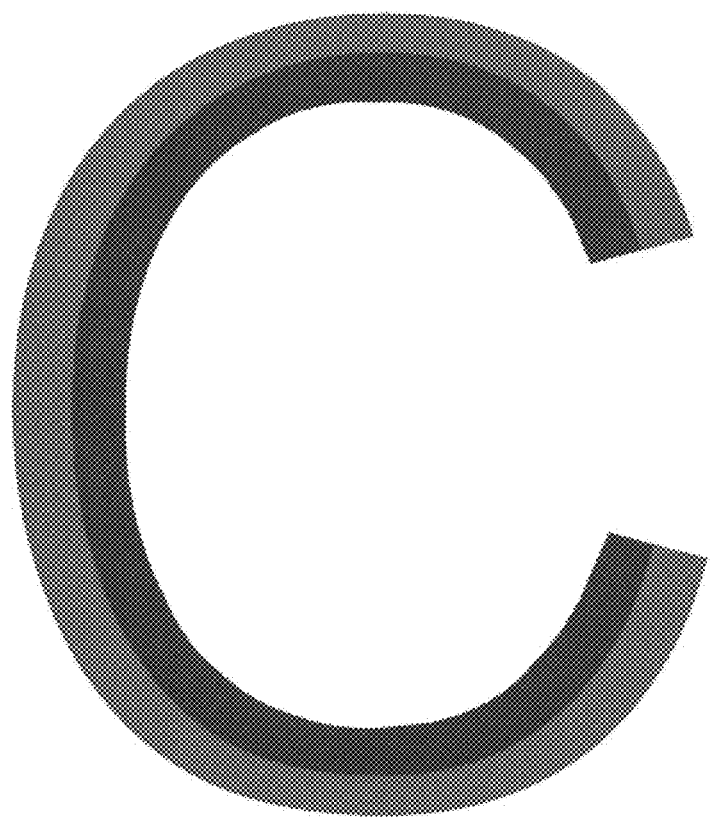
FIG. 3 is another example of a test image utilizing a shape made from two colors
Figure 4:
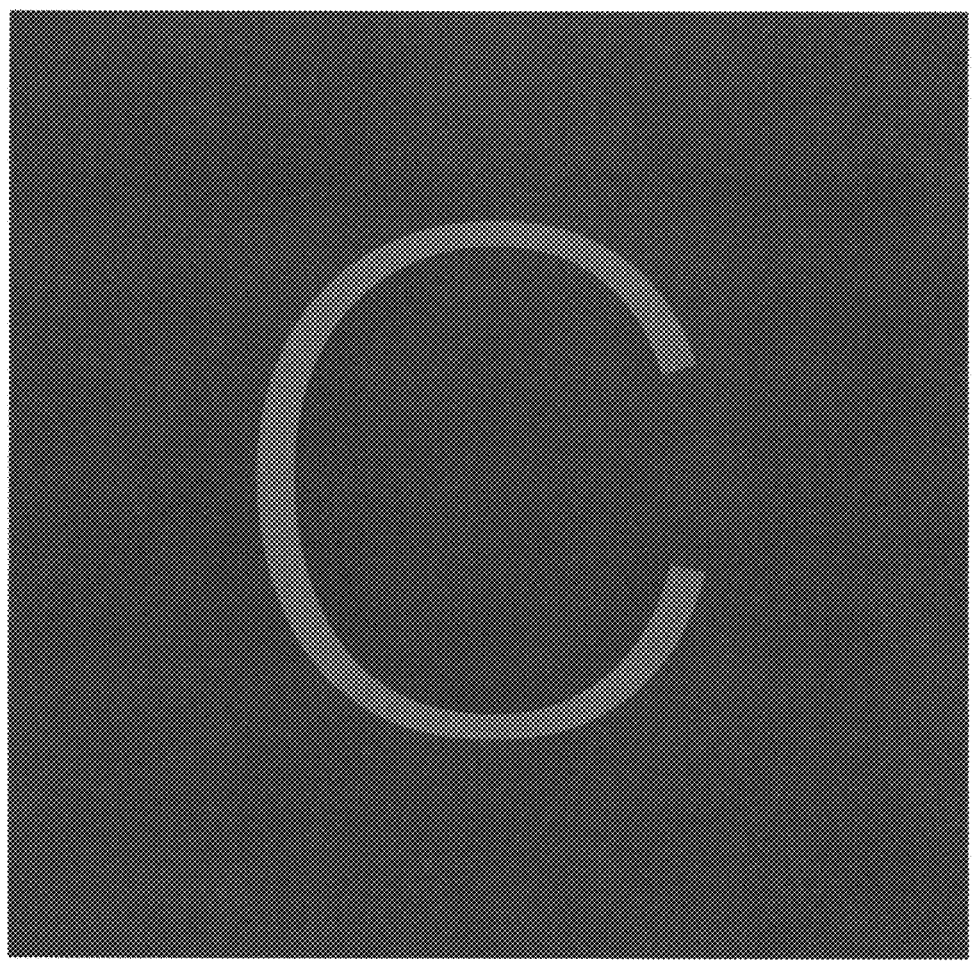
FIG. 4 is similar to the previous embodiment but utilizing a color background
Figure 5:
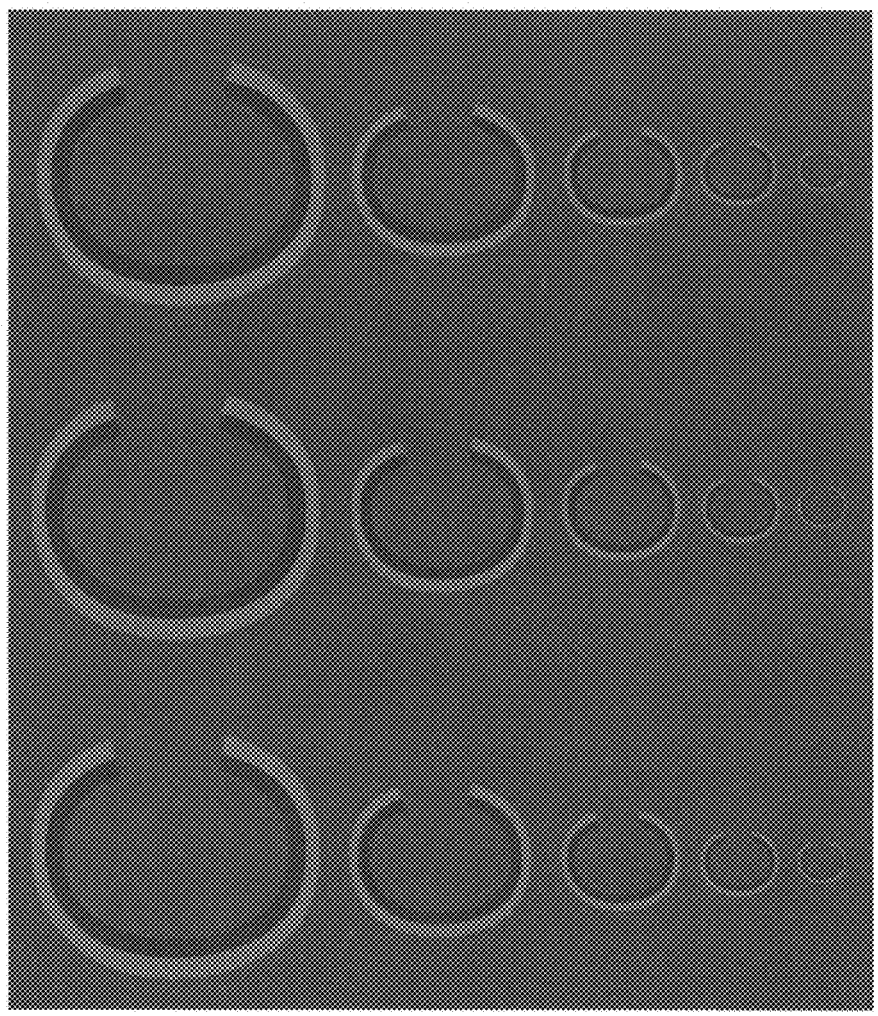
FIG. 5 shows the embodiment from FIG. 4 but in an array format as in FIG. 2.
Figure 6:
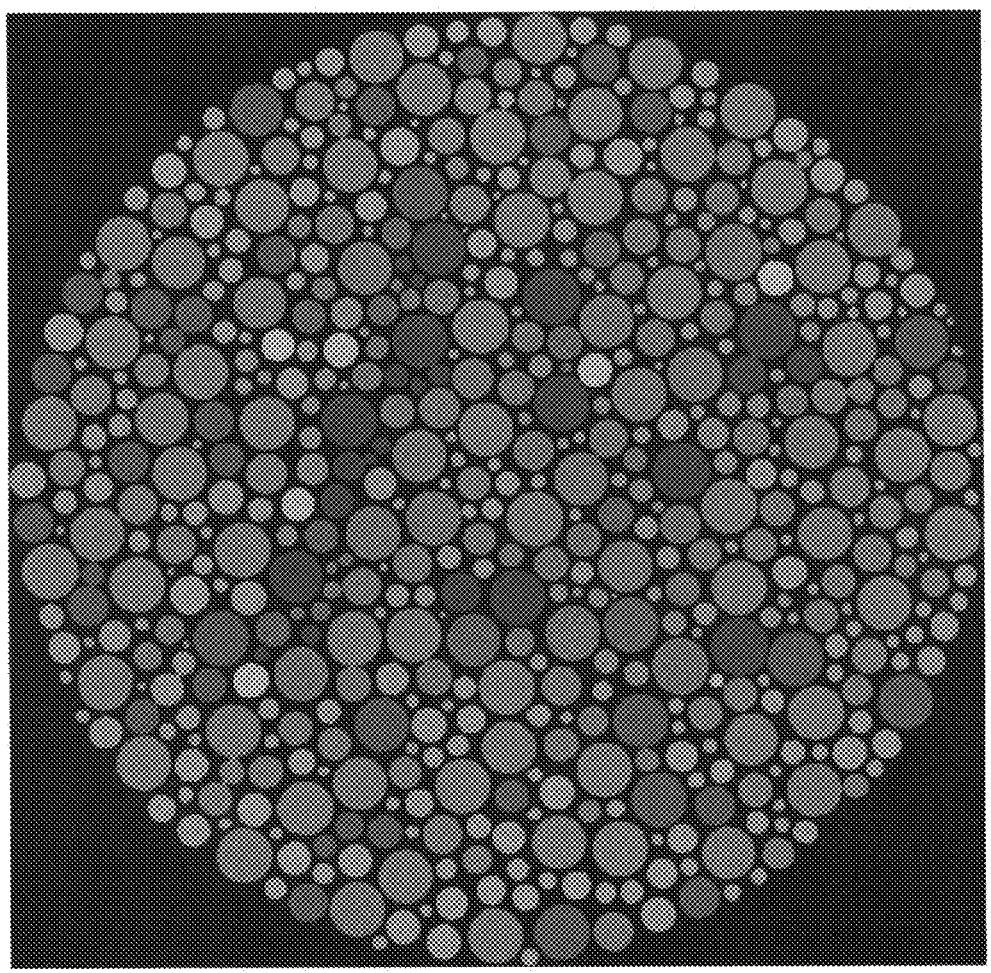
FIG. 6 depicts one example where a pattern may be hidden or distinguishable based upon the chromatic aberration of the optical device.
Figure 7:
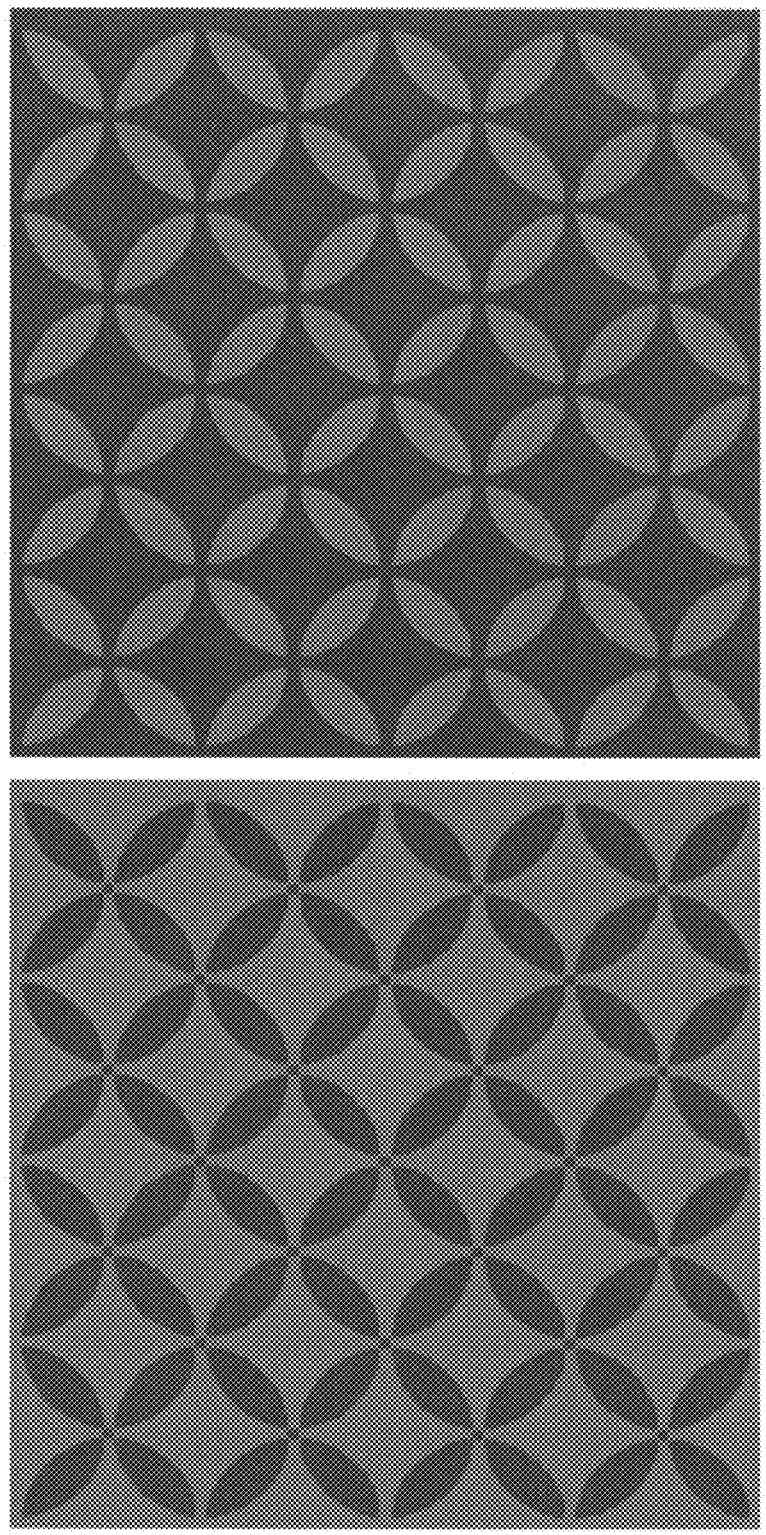
FIG. 7 depicts another example where a pattern may be hidden or distinguishable based upon the chromatic aberration of the optical device.

The visual testing method outlined is for the measurement of chromatic aberration in a range of optical devices. A specific application of such a visual testing method is for use in binoculars and other optical systems, where chromatic aberration can be minimized through the use of lower dispersion optical materials such as, ED (Extra-low Dispersion) glass in the objective lens of a binocular. The indicator of chromatic aberration is measured by the Abbe number, where a higher value corresponds to lower dispersion so that the focal lengths for all colors are close together as opposed to far apart. ED glass has a higher Abbe number than non-ED glass, which indicates a lower level of dispersion. No visual testing method currently exists that can distinguish the two since their difference is so small that it is almost completely unperceivable to all but the highly trained eye. A typical consumer may not be able to notice any difference between the two types in a binocular. Since there is a significant price differential and a difference in value, it is apparent that a test to display the ability of ED glass to reduce chromatic aberration would make it easier for a customer to decide between two products.

This visual testing method for chromatic aberration is based upon two concepts. First, chromatic aberration in an optical device bends the higher wavelengths of light farther away from the optical axis while lower wavelengths of light stay closer to the optical axis. This is a result of the different focal lengths of the optical elements according to wavelength. Furthermore, if you take two differently colored objects at different heights from the optical axis—for example, a red object close to the optical axis and a blue object slightly more offset from the optical axis, the image of the red object will be higher from the optical axis than expected based upon commonly used geometrical optics theory which does not account for chromatic aberration. Additionally, the blue object will now be closer to the optical axis, thereby bringing the composite image of each object closer to each other than the original image as demonstrated by FIG.

The second concept is based on the human perception of colors. In the human eye there are rods and cones, and cones are primarily responsible for color vision. There are three types of cones that respond to different wavelengths of light with a peak sensitivity in the blue, green and red ranges. The brain takes this data and interprets the color based upon the relative strength of the input received from these three cones. In the example of a red object overlaid with a blue object, primarily only two of the three cones would be active, and the subject would perceive the result as a magenta or purple color.

Exploiting these two concepts simultaneously, the invention results in a more binary, more easily distinguishable testing method such that the tester can view a distinctly different result directly correlated to the chromatic aberration of the optical device. For example, when testing an optical device with low chromatic aberration, the tester would see two distinct objects, a blue and a red image, but when testing an optical device higher with a higher chromatic aberration, the two colors would appear as a single, merged colored image. The example is only indicative of a single application of the testing method, however many versions can be conceived using various colors, patterns and combinations thereof based upon these two key concepts that were uniquely combined and utilized in this visual testing method.

Combination of the two key concepts depends on the proper selection of the testing parameters based upon several variables depending on the optical device tested and the testing environment. The size of each feature must be in a certain range dependant on several factors, the distance the tester is away from the testing apparatus, the aperture or lens size, the magnifying power of the optical device, the ambient lighting conditions, etc. As the user's distance from the test apparatus decreases, the size of the strips must decreases. As the magnification of the device increases, the size of the strips must also decrease. Depending on the approximate level of chromatic aberration in the optical devices, the size of the features also has to be selected to have a range such that some are merged and some remain distinct. For example, for testing an ED and non-ED 8×42 roof binocular in typical indoor lighting conditions, at a preferred distance of 70 feet, the testing feature size should range from at least 0.07 inches to 0.1 inches in width.

One of the benefits of this visual testing method is that even an untrained tester can detect small differences in chromatic aberration between optical devices, as well as see some chromatic aberration visually in optical systems that can otherwise be difficult to detect. Another significant benefit of this technique is its ability for the tester to visually distinguish the difference in chromatic aberration, when comparing ED and non-ED glass. In the field, the lower chromatic aberration in ED glass may be the difference between accurately viewing a colored stripe on the wing of a bird and therefore accurately identifying it, and seeing an incorrect color and therefore misidentifying.

The preferred embodiment of this test is a white background with a strip or an array of strips divided vertically, half red and half blue. The strips increase in width in each iteration. When viewed through an optical product with low chromatic aberration such as ED glass, the strips of color remain distinct, down to the thinnest strips. When viewed through an optical product with higher chromatic aberration such as non-ED glass, the strips of color begin to merge as the strips decrease in width. This clearly displays the higher tendency toward chromatic aberration present in non-ED glass.

Another preferred embodiment is strips of color that comprise red and yellow or blue and yellow.

Another preferred embodiment places these strips on a background that is gray or black in color.

Another preferred embodiment instead utilizes shapes, with two colors filling in the shape in a pattern.

Another preferred embodiment utilizes a letter, such as the letter C, comprised of two strips of color, decreasing in size and placed in a line.

Another preferred embodiment shows a distinguishable image utilizing two or more colors, where in the low chromatic aberration case the image is distinguishable, but in the high chromatic aberration case, the image is lost or hidden.

Therefore, in accordance with a preferred embodiment of the invention, a method for visually testing the chromatic aberration in an optical device is provided. In this preferred embodiment, the method utilizes a testing apparatus that has a representation of at least two or more colors denoted by their wavelength, such that each color utilized is separated by no less than 75 nanometers in wavelength, and where each color is set beside another in close proximity, in a pattern, shape, or letter, or any combination thereof, and further wherein a tester is positioned at a distance away from the testing apparatus that is the same or greater than the minimum focal distance of the optical device being tested, and the method comprises the steps of: viewing the testing apparatus through at least the optical device being tested, and visual observing the resulting image, either directly or indirectly by means of an imaging or projecting device; determining the degree of chromatic aberration based upon the number of distinctive objects viewed in a single test iteration, where two or more distinctive objects or features viewed corresponds to an optical device with low chromatic aberration, a partially merged object viewed corresponds to an optical device with medium chromatic aberration, and whereas only a single or merged object or feature viewed corresponds to an optical device with high chromatic aberration; and providing an assessment of the chromatic aberration based upon the determining step.

In some specific embodiments, the method may include the steps of repeating the viewing, determining and providing steps for comparing the relative chromatic aberration in two or more optical devices. In another embodiment, the providing step results in a rating for the optical device based upon the results of the determining step.

Additionally and/or alternatively, the optical device is provided that was designed to incorporate optical elements with different chromatic aberration, so that the user can compare the chromatic aberration between different optical materials. Moreover, the optical products compared are preferably but not necessarily binoculars with the same size objective lenses and the same overall magnification.

In accordance with preferred embodiments, the testing device preferably uses color pairings are separated by more than 150 nanometers, in preferred embodiments, such as red and blue, yellow and violet, or red and yellow. The testing device also preferably utilizes colors that are beside one another in close proximity in strips of equal length and width. Preferably, the testing device utilizes color strips arranged in an array with each iteration increasing in thickness. The testing device could also preferably utilize color strips set on a white or other color contrasting background (black, grayscale, or a color different from the color of the strips). The testing device's colors are also preferably utilized so that a pattern, such as a letter, number, or shape, is clearly distinguishable using a optical device with a low chromatic aberration, and undistinguishable in an optical device with a high chromatic aberration.

In another preferred embodiment, an apparatus for visually testing the chromatic aberration of an optical device is provided. In this preferred embodiment, the apparatus presents to the tester a representation of at least two or more colors denoted by their wavelength, such that each color utilized is separated by no less than 75 nanometers in wavelength, and where each color is set beside another in close proximity, in a pattern, shape, or letter, or any combination of those, on a background different from any of the two or more colors.

In specific embodiments, the optical products compared are preferably but not necessarily binoculars with the same size objective lenses and the same overall magnification. Similarly, the testing device preferably uses color pairings are separated by more than 150 nanometers, in preferred embodiments, such as red and blue, yellow and violet, or red and yellow. The testing device may also preferably utilize colors that are beside one another in close proximity in strips of equal length and width. Alternatively, the testing device may utilize color strips arranged in an array with each iteration increasing in thickness. Moreover, the testing device may utilize color strips set on a white or other color contrasting background (black, grayscale, or a color different from the color of the strips). Preferably, the testing device's colors are utilized so that a pattern, such as a letter, number, or shape, is clearly distinguishable using a optical device with a low chromatic aberration, and undistinguishable in an optical device with a high chromatic aberration In yet another preferred embodiment, a testing chart is provided, which is a representation of at least two or more colors denoted by their wavelength, such that each color utilized is separated by no less than 75 nanometers in wavelength, and where each color is set beside another in close proximity, in a pattern, shape, or letter, or any combination of those, on a background different from any of the featured colors. In a preferred embodiment, the testing chart uses color pairings are separated by more than 150 nanometers, in preferred embodiments, such as red and blue, yellow and violet, or red and yellow. The testing device may utilize colors that are beside one another in close proximity in strips of equal length and width. The testing device may utilize color strips arranged in an array with each iteration increasing in thickness. Moreover, the testing device preferably utilizes color strips set on a white or other color contrasting background (black, grayscale, or a color different from the color of the strips). The testing device's colors may also be utilized so that a pattern, such as a letter, number, or shape, is clearly distinguishable using a optical device with a low chromatic aberration, and undistinguishable in an optical device with a high chromatic aberration.

It will thus be seen that the objects set forth above, among those made apparent from the preceding description, are efficiently attained and, since certain changes may be made in the above constructions and methodologies without departing from the spirit and scope of the invention, it is intended that all matter contained in the above description or shown in the accompanying drawings shall be interpreted as illustrative and not in a limiting sense. It should also be understood that the following claims are intended to cover all of the generic and specific features of the invention described herein and all statements of the scope of the invention that as a matter of language might fall therebetween.

What is claimed is:

1. A method for visually testing the chromatic aberration in an optical device, where the method utilizes a testing apparatus that has a representation of at least two or more colors denoted by their wavelength, such that each color utilized is separated by no less than 75 nanometers in wavelength, and where each color is set beside another in close proximity, in a pattern, shape, or letter, or any combination thereof, and further wherein a tester is positioned at a distance away from the testing apparatus that is the same or greater than the minimum focal distance of the optical device being tested, wherein the method compromises the steps of:
   viewing the testing apparatus through at least the optical device being tested, and visual observing the resulting image, either directly or indirectly by means of an imaging or projecting device;
   determining the degree of chromatic aberration of the optical device based upon the number of distinctive objects viewed in a single test iteration, where two or more distinctive objects or features viewed corresponds to an optical device with low chromatic aberration, a partially merged object viewed corresponds to an optical device with medium chromatic aberration, and whereas only a single or merged object or feature viewed corresponds to an optical device with high chromatic aberration; and
   providing an assessment of the chromatic aberration based upon the determining step.

2. The method as claimed in claim 1, including the steps of repeating the viewing, determining and providing steps for comparing the relative chromatic aberration in two or more optical devices.

3. The method as claimed in claim 1, wherein the providing step results in a rating for the optical device based upon the results of the determining step.

4. The method as claimed in claim 1, where the optical device was designed to incorporate optical elements with different chromatic aberration, so that the user can compare the chromatic aberration between different optical materials.

5. The method as claimed in claim 1, where the optical devices compared are binoculars with the same size objective lenses and the same overall magnification.

6. The method as claimed in claim 1, wherein the testing device uses color pairings are separated by more than 150 nanometers, in preferred embodiments, such as red and blue, yellow and violet, or red and yellow.

7. The method as claimed in claim 1, wherein the testing device utilizes colors that are beside one another in close proximity in strips of equal length and width.

8. The method as claimed in claim 1, wherein the testing device utilizes color strips arranged in an array with each iteration increasing in thickness.

9. The method as claimed in claim 1, in which the testing device utilizes color strips set on a white or other color contrasting background (black, grayscale, or a color different from the color of the strips).

10. The method as claimed in claim 1, where the testing device's colors are utilized so that a pattern, such as a letter, number, or shape, is clearly distinguishable using an optical device with a low chromatic aberration, and undistinguishable in an optical device with a high chromatic aberration.

11. The method as claimed in claim 1, including the step of selecting the optical device with the lower degree of chromatic aberration based at least in part on the assessment step.

12. The method as claimed in claim 11, including the step of purchasing or selling the optical device with the lower degree of chromatic aberration based at least in part on the assessment step.

13. The method as claimed in claim 1, including the step of selecting the optical device with the higher degree of chromatic aberration based at least in part on the assessment step.

14. The method as claimed in claim 13, including the step of purchasing or selling the optical device with the higher degree of chromatic aberration based at least in part on the assessment step.

15. An apparatus for visually testing the chromatic aberration of an optical device, which presents to a tester, a representation for determining the degree of chromatic aberration of the optical device, wherein the representation is of at least two or more colors denoted by their wavelength, such that each color utilized is separated by no less than 75 nanometers in wavelength, and where each color is set beside another in close proximity, in a pattern, shape, or letter, or any combination of those, on a background different from any of the two or more colors.

16. An apparatus according to claim 15, where the optical products compared are binoculars with the same size objective lenses and the same overall magnification.

17. An apparatus according to claim 15, wherein the testing device uses color pairings are separated by more than 150 nanometers, in preferred embodiments, such as red and blue, yellow and violet, or red and yellow.

18. An apparatus according to claim 15, wherein the testing device utilizes colors that are beside one another in close proximity in strips of equal length and width.

19. An apparatus according to claim 15, the testing device utilizes color strips arranged in an array with each iteration increasing in thickness.

20. An apparatus according to claim 15, in which the testing device utilizes color strips set on a white or other color contrasting background (black, grayscale, or a color different from the color of the strips).

21. An apparatus according to claim 15, where the testing device's colors are utilized so that a pattern, such as a letter, number, or shape, is clearly distinguishable using an optical device with a low chromatic aberration, and undistinguishable in an optical device with a high chromatic aberration.

22. A testing chart which is a representation for determining the degree of chromatic aberration of the optical device, wherein the representation of at least two or more colors denoted by their wavelength, such that each color utilized is separated by no less than 75 nanometers in wavelength, and where each color is set beside another in close proximity, in a pattern, shape, or letter, or any combination of those, on a background different from any of the featured colors.

23. A testing chart according to claim 22, wherein the testing device uses color pairings are separated by more than 150 nanometers, in preferred embodiments, such as red and blue, yellow and violet, or red and yellow.

24. A testing chart according to claim 22, wherein the testing device utilizes colors that are beside one another in close proximity in strips of equal length and width.

25. A testing chart according to claim 22, the testing device utilizes color strips arranged in an array with each iteration increasing in thickness.

26. A testing chart according to claim 22, in which the testing device utilizes color strips set on a white or other color contrasting background (black, grayscale, or a color different from the color of the strips).

27. A testing chart according to claim 22, where the testing device's colors are utilized so that a pattern, such as a letter, number, or shape, is clearly distinguishable using an optical device with a low chromatic aberration, and undistinguishable in an optical device with a high chromatic aberration.

28. The method as claimed in claim 1, wherein the method comprises the step of:
determining the degree of chromatic aberration based upon the number of distinctive objects viewed in a single test iteration, where two or more distinctive objects or features viewed corresponds to an optical device with low chromatic aberration, a partially merged object viewed corresponds to an optical device with medium chromatic aberration, and whereas only a single or merged object or feature viewed corresponds to an optical device with high chromatic aberration, wherein the single or merged object appears to the tester as a color different from the non-background colors used in the pattern, shape or letter, or any combination thereof.

29. The method as claimed in claim 1, including the step of:
providing a binary assessment of chromatic aberration per each test iteration, wherein a positive result is given if a plurality of distinctive objects are viewed by the tester, and a negative result is given if a single or merged object are viewed by the tester, and a negative result is given if a single or merged object are viewed by the tester, wherein the single or merged object appears to the tester as a color different from the non-background colors used in the pattern, shape or letter, or any combination thereof.

* * * * *